United States Patent [19]

Julie

[11] 4,445,459

[45] May 1, 1984

[54] ANIMAL PET PORCH AND CONTAINER

[76] Inventor: Patricia Julie, 825 Harristown Rd., Glen Rock, N.J. 07452

[21] Appl. No.: 486,712

[22] Filed: Apr. 20, 1983

[51] Int. Cl.³ .............................................. A01K 1/03
[52] U.S. Cl. ........................................ 119/1; 119/19; 47/40
[58] Field of Search ................... 119/1, 15, 19; 47/40; 52/36

[56] References Cited

U.S. PATENT DOCUMENTS

| | | | |
|---|---|---|---|
| 1,152,899 | 9/1915 | Moore | 47/40 |
| 1,407,447 | 2/1922 | Tompkins | 47/40 X |
| 1,653,775 | 12/1927 | Lose | 47/40 X |
| 3,144,852 | 8/1964 | Messeas | 119/19 |
| 3,280,796 | 10/1966 | Hatcher | 119/19 |
| 3,324,831 | 6/1967 | St. Onge | 119/19 |
| 3,857,365 | 12/1974 | Mueller | 119/1 |
| 4,029,048 | 6/1977 | Gershbein | 119/19 X |

Primary Examiner—Robert P. Swiatek
Attorney, Agent, or Firm—Alexander Mencher

[57] ABSTRACT

A removable, assemblable and portable window porch and container for animal pets which is adapted to interfit within, project from and extend the opening of a standard window. The device has attaching clamps and braces secured to and carried by the elements thereof. The porch when in operative position is in the form of an open entry enclosure comprising assemblable base, side, rear and top walls for effectuating operative condition. The side, rear and top walls include frame pieces adapted for selective panel mounting and substitution to enable protecton to the pet against adverse weather and atmospheric conditions. The porch is further adapted for pet transportation when in operative condition by providing a removable front wall closure and further providing a carrying handle. The porch when in disassembled position may be easily stored away and is characterized by taking little space in stored condition.

4 Claims, 9 Drawing Figures

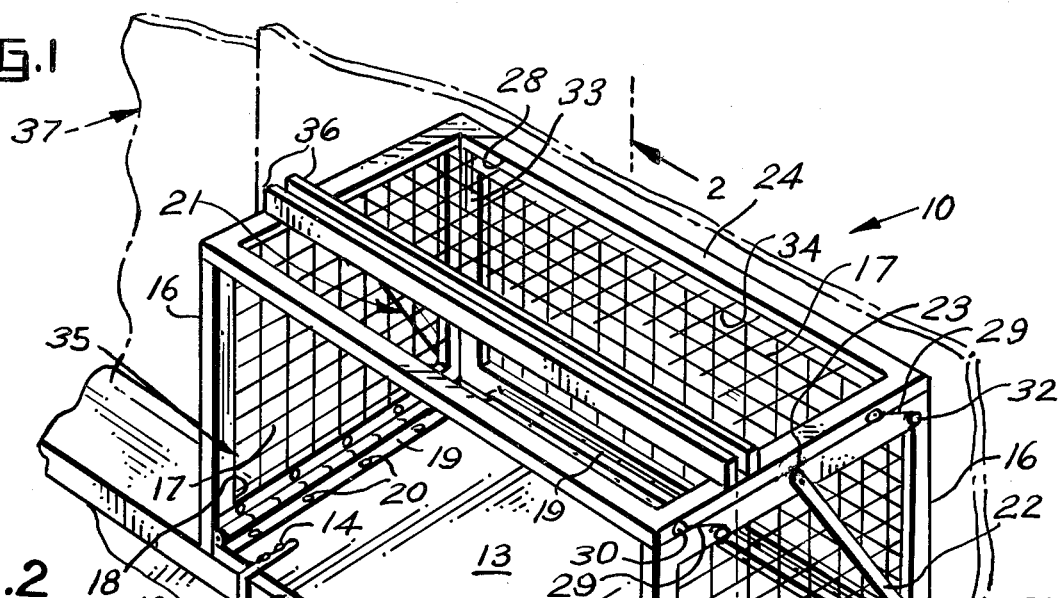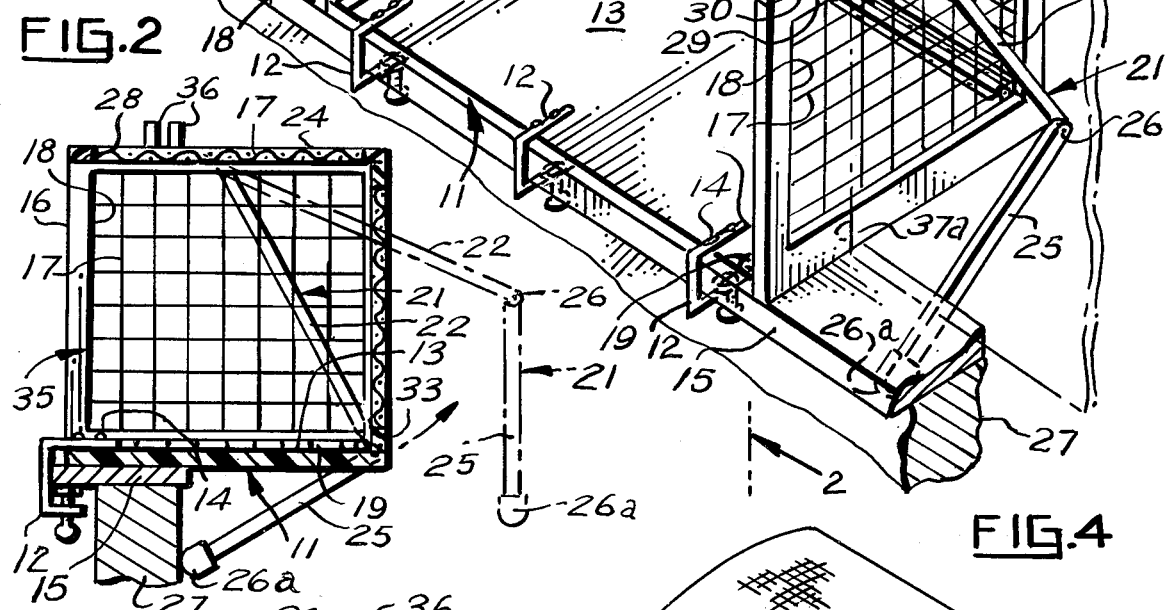

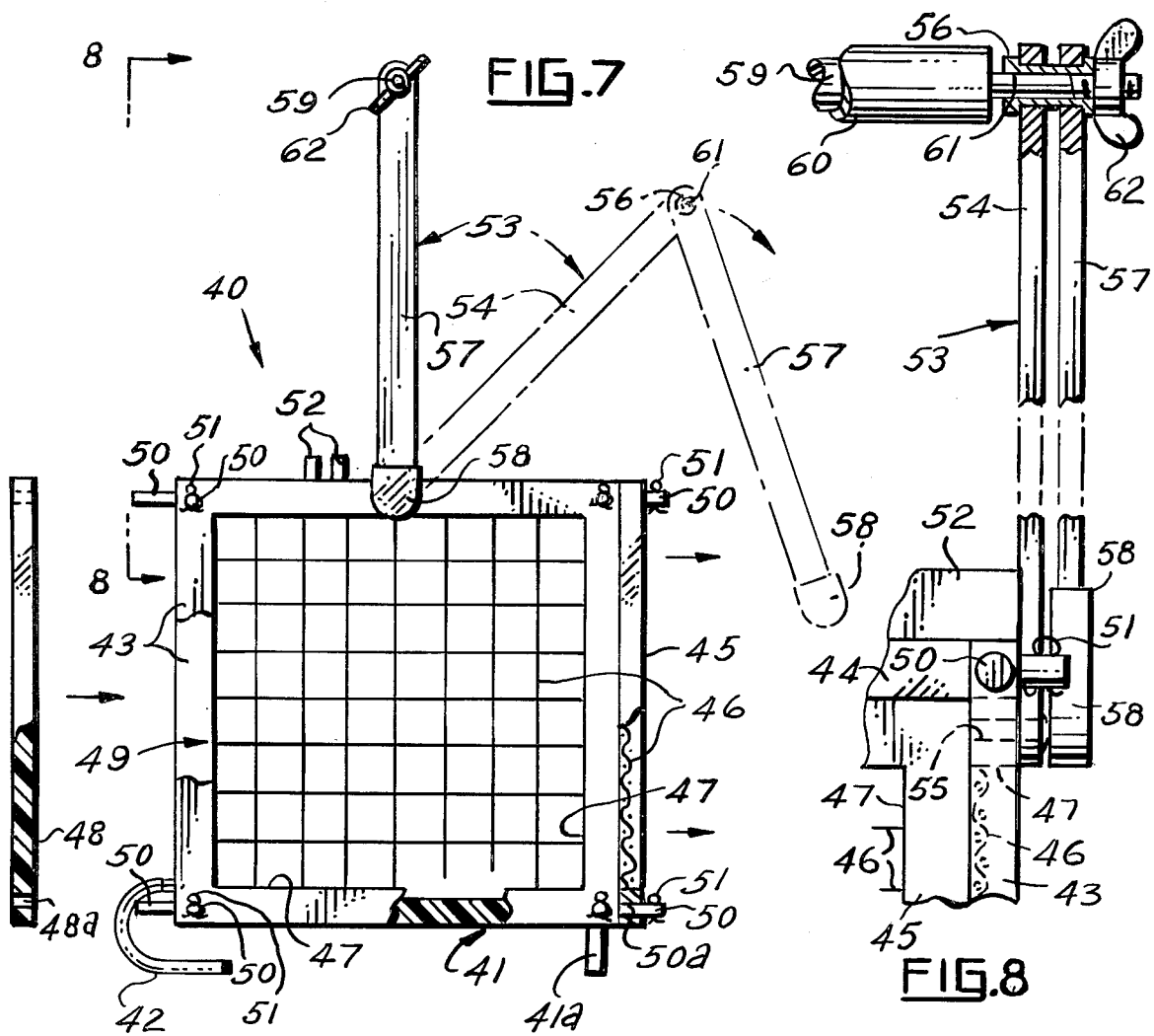
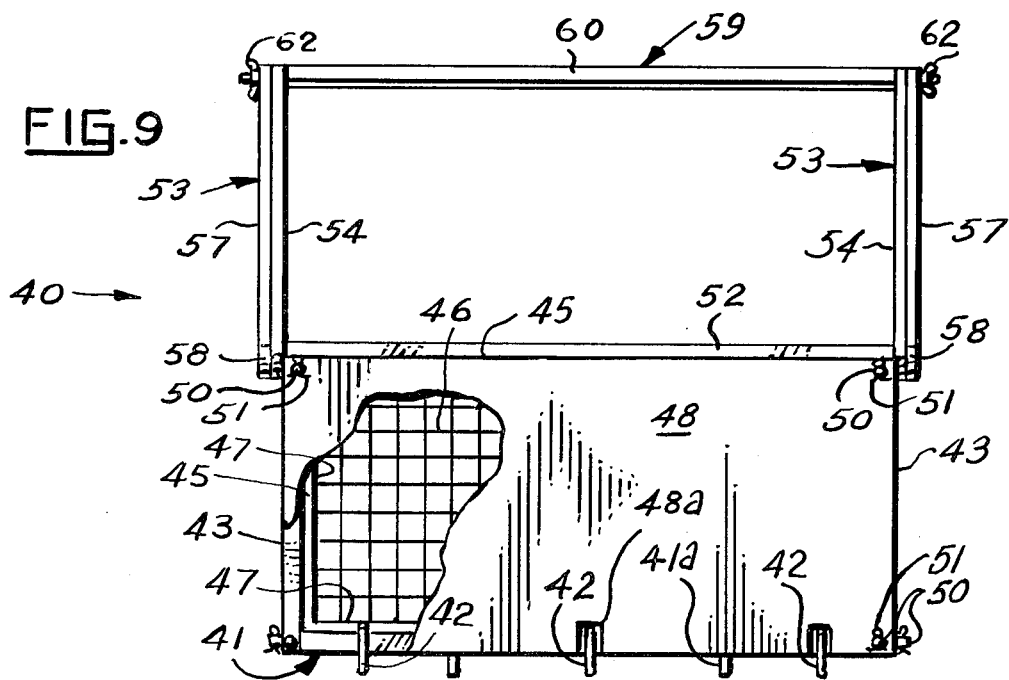

ANIMAL PET PORCH AND CONTAINER

BACKGROUND OF INVENTION

The invention relates generally to a removable, collapsible and portable window porch enclosure for animal pets adapted to interfit within, project from and extend the opening of a standard window, and more specifically to a type of porch having interchangable panels forming part of the side, rear and top walls for adaptation to external weather and atmospheric conditions, and wherein said device is capable of use for animal transportation.

The field of art which applicant's invention is related to includes collapsible animal houses and window case structures for plants and animals in the following classes and subclasses:

Class 119, subclasses 17, 15, 19,
Class 52, subclass 29,
Class 47, subclasses 39, 40.

The following U.S. patents deemed most relevant and reviewed are:

U.S. Pat. Nos. 2,092,155; 2,932,279; 2,954,007; 3,593,463; 3,698,143; 4,023,306.

None of above patents discloses the pet porch of applicant, the novel features of which include a knock-down or collapsible and portable enclosure adapted (1) to interfit within and project from the opening of a standard window; (2) to be removable by attaching means carried by the porch parts; (3) to be provided with interchangable panels in the wall portions for meeting external weather conditions; (4) to serve as a means for pet transportation.

SUMMARY AND OBJECTS OF THE INVENTION

The present disclosure embraces a portable and collapsible box-like structure particularly to serve as a porch for pets and having an entrance within the room of a building and interfitting in and removable from any standard window frame. The device is provided with a closure to the entrance opening and also a handle for transportation of the pet when required.

A main object of the invention is to form the device so that it can be abutted directly across the window frame without requiring modification and redesign of said frame.

Another object is to provide a removable, portable and collapsible exterior pet porch as described that can be swiftly and easily mounted in and attached to a window without the requirement of special skills.

A further object of the invention is to provide the means for pet care within the home that normally would require animal supervision outside of the home.

Another object of the invention resides in the simple, efficient, sturdy and low cost of production of the device and having attributes including small space storeability, lightness in weight, features of wall panel changeability and convertibility of the porch to a pet transportation means.

These objects and other ends and advantages of the invention will hereinafter be set forth in the progress of the disclosure and as will be pointed out in the appended claims.

DRAWINGS OF PREFERRED EMBODIMENT

Accompaning this specification are drawings showing a preferred form of the invention and wherein:

FIG. 1 is a view in perspective of a preferred embodiment of the invention installed on a window sill, the latter being fragmentarily shown, a typical sliding window panel arrangement also fragmentarily being shown and in phantom for enclosing the device within a window opening;

FIG. 2 is a cross-sectional view of FIG. 1 along the plane 2—2 with the sliding panel arrangement removed therefrom and illustrating a disengaged position of one of the hinge-type braces of the structure;

FIG. 3 is an enlarged and fragmentary rear view of FIG. 1 shown in elevation and removed from the window sill and independent of the sliding panel arrangement;

FIGS. 4, 5 and 6 are reduced perspective views with FIGS. 5 and 6 shown fragmentarily and wherein FIG. 4 shows a cushion for the base of the device and as removed from the structure of FIG. 1; wherein FIG. 5 shows an interchangeable transparent, translucent or opaque top member selectable to meet weather conditions; and FIG. 6 illustrates any other type of interchangeable wall member;

FIG. 7 is a side view of a modified form of the invention shown in elevation and partly in section with the front wall of the device removed therefrom and illustrating a modification of the brace members in pivotal positions with the associated carrying handle removed therefrom;

FIG. 8 is an enlarged and fragmentary view taken along the plane 8—8 of FIG. 7 and illustrating the handle mounting means for the modified device, said means being shown in section; and FIG. 9 is a front view of FIG. 7 shown in elevation and partly broken-away with a front wall secured to the device of FIG. 7.

DESCRIPTION OF PREFERRED EMBODIMENT

In accordance with the invention and the preferred form shown, a porch 10 as best seen in FIG. 1 includes a base 11 as shown in rectangular shape and made of any suitable and sturdy material such as plastic or plastic covered material. Releasable fastening means are provided for attachment of the device within the window frame such as a plurality of spaced and insulated or rubber-covered screw clamps 12. These are fixedly secured to the front open end of porch 10 and are disposed adjacent to the front edge and top surface 13 of base 11 by suitable fasteners 14, clamps 12 serving to engage the front portion of window sill 15 for securing the inner end of porch 10 thereto in a releasable fashion as will appear.

Side walls are provided for porch 10, and as shown are in the form of a pair of substantially square side frames 16 preferably formed of plastic and include a pair of plastic-laminated wire screens 17 which are suitably and fixedly secured within the frame openings 18. It is to be observed that all porch surfaces to be in contact with the pet should be of non-metallic material to avoid possible burns from absorbed heat from the sun and to avoid possible lightning attraction.

Side frames 16 of the porch side walls are pivotally secured to the base or bottom wall 11 in any suitable manner. E.g. a piano type hinge 19 is fixedly secured at one side to the inside bottom part of side frames 16 by suitable fasteners 20, and the opposite sides of hinges 19 are fixedly secured to the ends of top surface 13 of base 11 in the same manner as above described.

Bracing means are provided in addition to clamps 12 for securing porch 10 within the window frame. As seen in FIGS. 1 and 2, a pair of similar braces are provided each attached to one of the porch side wall frames. Thus, each brace member 21 includes an upper rod 22 pivotally secured to pin 23 located and secured to the upper end of frame 16 of the porch side wall and intermediate the ends thereof. Each brace member 21 further includes a lower rod 25 pivotally secured at one end to rod 22 as by pin 26, the lower end of rod 25 being adapted to be frictionally received in a friction-producing or rubberized plastic foot 26a.

Thus, when clamps 12 are engaged with window sill 15, the foot 26a of brace member 21 is pushed upwardly to become engaged with the exterior wall 27 of the building. Clamps 12 and braces 21 cooperate with each other to render porch attachment safe and secure within the window opening.

Top wall frame 24 as shown is rectangular in shape and includes a screen 17 as in the other wall frames and is plastic-laminated, the screen being suitably secured within the opening 28 of said frame 24. Said frame 24 is adapted to maintain said side wall frames 16 and a rear wall frame 33 in upright and operable condition for porch as will be described. Thus removable attachment of top wall frame 24 to the side wall frames 16 is suitably provided as by a pair of hooks 29 as best seen in FIG. 3, said hooks being pivotally secured at one end to pins 30, the latter being fixedly secured to the end edge of top wall frame 24. The opposite or free ends of hooks are adapted to be frictionally received by a pair of pins fixedly secured to the upper part of side frames 16. As shown, pins 31 include heads 32 so as to keep hooks 29 in place so that side frames 16 are prevented from pivoting outwardly about their hinge means 19 from the structure of porch 10 when in operative or assembled condition.

The said rear wall frame 33 as shown is rectangular and includes the screen 17 secured within its opening 34. Frame 33 is secured to the rear of the top surface 13 of base 11 as by a piano-type hinge 19 in order to pivot downwardly and inwardly of the structure of porch 10 in the same manner as do the side frames 16. As in the releasable securement between side frames 16 and top frame 24, rear wall frame 33 is similarly releasably secured to top frame 24 as heretofore described. Thus, and although not shown in the drawings, another pair of hooks as 29 is provided and spaced and pivotally secured to the rear edge of the top frame 24, said hooks being adapted to frictionally engage pins such as 31, the latter being secured along the top edge of rear wall frame 33. Rear frame 33 is thus also prevented from pivoting outwardly and away from base 11 when the porch structure is in assembled and operative condition.

A suitable cushion or pillow 34 may be provided which is receivable on surface 13 of base 11 for pet comfort when placed or put within the porch through the entrance opening 35. Moreover, to accommodate various window frame sizes or when necessary, conventional and removable slideably adjustable window panel devices may be utilized to fil any open surrounding area between porch 10 in installed position and the window frame. For this purpose, one form of accommodation among others well known includes means for removable attachment of any such device. As shown, such mounting means is in the form of a pair of spaced-apart and parallel guide rails 36 secured to top wall frame 24. And cooperating therewith is the panel device 37 as diagrammatically shown and in phantom in FIG. 1, said device being of the easily removable and slideably adjustable in length type and which is storeable in little space when dismantled and not in use.

It is to be noted that top wall frame 24 may be provided with interchangeable wall insertions or panels such as opaque panel 38 (FIG. 6) or translucent or transparent panel 39 (FIG. 5), said panels including hooks as 29 along the end edges for engagement with the pins 30 of side frames 16. Panels 38 and 39 may further employ the use of suitable rails such as 36 on the outer surfaces if desired for receiving a similar panel device as 37 heretofore set forth. Moreover, the side wall frames 16 may have panels as 38 and 39 and attached thereto by suitable engagement with interstices of screens 17 instead of with pins 30.

In use, porch 10 is installed on window sill 15 by engaging clamps 12 with the front of sill 15 following assemblage of side, top and rear walls 16, 24 and 33 into operative condition. Then braces 21 are pivoted rearwardly as shown in FIG. 2 until feet 26a engage the building exterior wall 27 (FIG. 1). Thereafter, brace rods 25 are urged upwardly by the housewife or installer thereby resulting in a rugged and secure mounting of porch 10. When porch 10 in assembled condition takes up the full width of the window frame, the only subsequent operation is to lower the lower window sash on top wall 24 for closing any open gap surrounding the installed porch 10. When the porch 10 is intermediate the width of the window frame, the panel device as aforestated is then introduced and fitted with the opening edge portion 37a thereof lodged between the rail members 26. The lower window sash is then lowered on top of the top edge of the panel device after slideable adjustment thereof is made. The pet is then placed in the entrance opening 35. Use of panel devices to close gaps within the window frame and surrounding the porch is a safety factor for prevention of accidental falls or jumping entrances into the porch as by a cat type of pet.

To remove and dismantle porch 10 from the window opening, lower window sash (not shown) is raised and panel device 37 removed. Clamps 12 are loosened and braces 21 are then disengaged from building wall 27 by pushing downwardly on lower rods 25. This causes a release of the feet 26a from wall 27. The porch 10 is then held by its side walls or frames 16 and pulled toward the user. This will disengage the loosened clamps 12 from window sill 15, and permit the removal of the porch.

Porch 10 when removed from the window may be placed on a table or other surface and hooks 29 of top wall frame 24 are unlatched from the pins 31 of the side wall frames 16 and the rear wall frame 33 and removed. Thereafter the said side and rear walls are pivoted downwardly toward base 11. Rods 22 and 25 of each of the braces 21 are then pivoted into closed and in aligned position and the porch parts in such disassembled condition may be stored in a suitable place or carton thereby taking up little room or space.

It is to be noted that the structure of porch 10 is of such nature that installation and removal are simple and accomplished without tools. Moreover, the insulated wire screening 17 for circulation and ingress of air and sunlight and as illustrated in FIGS. 1–6 may be replaced by providing suitable opaque, transparent or translucent panels 43 and 45 if desired and as shown in in FIGS. 7-9, a modified porch structure.

MODIFIED PORCH STRUCTURE

Thus, the modified porch 40, serving as both a pet porch and a transportation unit includes a base 41 having a plurality of insulated wire clamps 42 and slightly modified from clamps 14 of porch 10. The clamps are fixedly secured to base 41 for engaging sill 15 as in the case of porch 10. A pair of side wall frames 43, a top wall frame 44 and a rear wall frame 45 are provided each of which includes a screen 46 suitably and fixedly secured within each of the openings 47 of each of such frames as in porch 10 for ingress of air, sunlight and circulation. A front panel 48 such as of opaque plastic may be provided to close off the front opening 49 of porch 40 when the device is to be used to transport a pet.

Side wall frames 43 are adapted to be removably secured to the end edges of top wall frame 44 and base 41 by a plurality of projecting pins 50 adapted to receive cotter keys 51. Pins 50 are fixedly secured in openings (not shown) in the ends of top wall frame 44 and base 41. Similar pins 50 are secured in the side ends of side frames 43 and are received in openings 50a in rear frame 45 so as to render rear frame 45 and front panel 48 secure to form porch 40. Pins 50 on the edges of side wall frames 43 and in the front of porch form 40 are received in openings 48a of front panel 48 (FIG. 7), all the pins as described receiving cotter keys or pins 51.

A pair of rails 52 are fixedly secured to top wall frame 44 to secure a conventional sliding panel device in the same manner and for the same purpose as described with respect to porch 10. Similarly, a pair of braces 53 are provided equivalent to braces 21 of porch 10 but further providing mounting means for a handle when the device is used as a transportation means for pets.

Thus, braces 53 each include an upper rod 54 which is pivotally secured at one end to a pin 55, the latter being fixedly secured at the upper center of side frames 43 as best seen in FIG. 8. At the opposite end of upper rod 54, the latter receives a flanged bushing 56. The lower rod 57 of each of the braces 53 is pivotally received at one end to the bushing 56 while the opposite or free end includes a friction-producing foot 58 such as of rubber or the like as in porch 10 whereby to frictionally engage a wall in the same manner as heretofore described with respect to porch 10.

When modified porch form 40 is not in use as a porch structure, braces 53 will serve as a means of receiving handle 59 for the user to carry modified porch form 40 to any desired location with the pet therein. Said carrying handle 59 is adapted to receive a sleeve 60 of any suitable material to provide comfort for the hand of the carrier. The ends of handle 59 are each removably received in the openings 61 of the bushings 56, said ends being threaded to receive wingnut fasteners 62. Thus, when handle 59 is in porch-carrying position and engaged in the braces 53, the lower rods 57 thereof are pivoted to align with the upper rods 54 while the rubber feet 58 tend to frictionally retain this alignment.

In operative condition, modified porch form 40 functions as porch 10 but in addition is provided with the front panel 48 which may be attached over the entrance opening 49 when porch 40 serves as a carrier. Moreover, when serving as a carrier, the braces 53 also serve as the mounting means for handle 59.

To dismantle porch 40 for storage purposes, all the cotter keys 51 are removed from their respective pins 50 of the base 41, the side frames 43, the top frame 44, the rear frame 45 and the front panel 48. In transportable condition for carrying a pet, porch 40 may be provided with a pair of spaced posts 41a fixedly secured to the bottom of base 41 whereby to cooperate with hooks 42 to maintain the porch in level position when said porch and pet therein are placed on the ground or other surface.

It is understood that minor changes and variations in the material, assembly of parts, integration, size and cooperation of parts of the invention may all be resorted to without departing from the spirit of the invention and the scope of the appended claims.

I claim:

1. In a portable and disassemblable porch for pets adapted to be removably attachable to the sill of a window frame and to interfit and project beyond the opening of a standard window within said frame whereby to extend said opening, the improvement comprising in combination: an enclosure comprised of a base, a pair of side walls and a rear wall, said walls each being pivotally secured to and collapsible on said base; a top wall removably securable to said side and rear walls providing an entrance opening and for maintaining each of said walls in vertical and operative position; clamping means attached to said base for adjustable and releasable securement to the sill of the window frame; a pair of braces each being collapsible intermediate the ends thereof and each being pivotally secured at one end to each of said pair of side walls and each having means at the other end adapted to frictionally engage the building exterior wall below said window sill for cooperating with said clamping means in rendering said porch stationary within the window opening.

2. In a portable and disassemblable porch for pets as set forth in claim 1 wherein engaging means are secured to said top wall for receiving removable, adjustable and sliding panel means to close said window opening surrounding the porch therewithin.

3. In a portable and disassemblable porch for pets as set forth in claim 1 wherein at least one of said walls is comprised of a frame having a screen panel therewithin, and wherein the entrance opening of said porch is provided with a covering panel having releasable means of attachment to at least two of the base, top and side wall elements of the porch.

4. A portable and disassemblable porch for pets adapted to be releasably attachable to the sill of a window frame and to interfit with and project beyond the opening of a standard window within said frame whereby to extend said opening, and comprising: a base, top, rear and a pair of side walls; releasable securing means between said base and walls to maintain same in assembled and enclosure form; clamping means attached to said base for releasable securement to the sill of the window frame; a pair of collapsible braces each pivotally secured at one end to each of said pair of side walls, and at the other end adapted to releasably engage the building exterior wall below said window sill for cooperating with said clamping means in rendering said porch stationary within the window opening; engaging means secured to said top wall for receiving removable and adjustable panel means to close said window opening surrounding the porch therewithin; a releasably attachable front wall for covering the entrance opening of said porch when said porch is used as a transportation device; and means for releasable attachment of said front wall between said front wall and at least two other of said walls of the porch; a carrying handle for the porch when serving as a transportation device; and means for releasably connecting said handle between said braces.

* * * * *